(12) United States Patent
Chen (10) Patent No.: US 8,480,182 B2
(45) Date of Patent: Jul. 9, 2013

(54) REAR HUB ASSEMBLY FOR BICYCLE (76) Inventor: Fu Sheng Chen, Taichung (TW)

( * ) Notice: Subject to any disclaimer, the term of this patent is extended or adjusted under 35 U.S.C. 154(b) by 490 days.

(21) Appl. No.: 12/943,025

(22) Filed: Nov. 10, 2010

(65) Prior Publication Data
US 2012/0112522 A1 May 10, 2012

(51) Int. Cl.
B60B 1/04 (2006.01)
B60B 27/00 (2006.01)

(52) U.S. Cl.
USPC .......................................... 301/110.5; 301/59

(58) Field of Classification Search
USPC ................. 301/55, 56, 59, 74, 110.5
See application file for complete search history.

(56) References Cited

U.S. PATENT DOCUMENTS

| 607,175 | A | * | 7/1898 | Keating | 301/56 |
| 2,702,725 | A | * | 2/1955 | Lyman | 301/59 |
| 5,489,147 | A | * | 2/1996 | Borsai | 301/59 |
| 7,192,097 | B2 | * | 3/2007 | Schlanger | 301/57 |
| 7,374,251 | B2 | * | 5/2008 | Okajima et al. | 301/58 |
| 7,651,172 | B2 | * | 1/2010 | Meggiolan | 301/110.5 |
| 8,096,623 | B2 | * | 1/2012 | You | 301/6.1 |
| 2008/0309152 | A1 | * | 12/2008 | Veux et al. | 301/59 |
| 2011/0227401 | A1 | * | 9/2011 | Huang | 301/110.5 |

FOREIGN PATENT DOCUMENTS

DE 19537808 A1 * 4/1997

* cited by examiner

Primary Examiner — Kip T Kotter (57) ABSTRACT

A rear hub assembly for bicycle includes a ratchet wheel and a hub body assembled with the ratchet wheel. The hub body has a first hub plate disposed on one end thereof. The first hub plate has a plurality of protrusions formed on an outer lateral surface thereof. A dodging portion is formed between every two adjacent protrusions. A plurality of recesses are defined in an inner lateral surface of the first hub plate. A plane portion is formed between every two adjacent recesses. The first hub plate has a plurality of bores defined therein and located on each protrusion and dodging portion. A first and a second stepped level difference are respectively defined between every recess and plane portion; and between every protrusion and dodging portion. A plurality of spokes engaged with the bores respectively and buckled the first hub plate.

5 Claims, 12 Drawing Sheets

REAR HUB ASSEMBLY FOR BICYCLE

BACKGROUND OF THE INVENTION

1. Field of the Invention

The present invention relates to bicycle hubs, and more particularly to a rear hub assembly for bicycle for providing a remarkable stability and enhancing an overall strength of a wheel set.

2. Description of Related Art

Cycling has become an extremely popular recreational activity throughout the world in recent decades. As more and more people indulge themselves in cycling, a demand for innovation and improvement of bicycles and bicycle parts has arisen.

Figure 7:
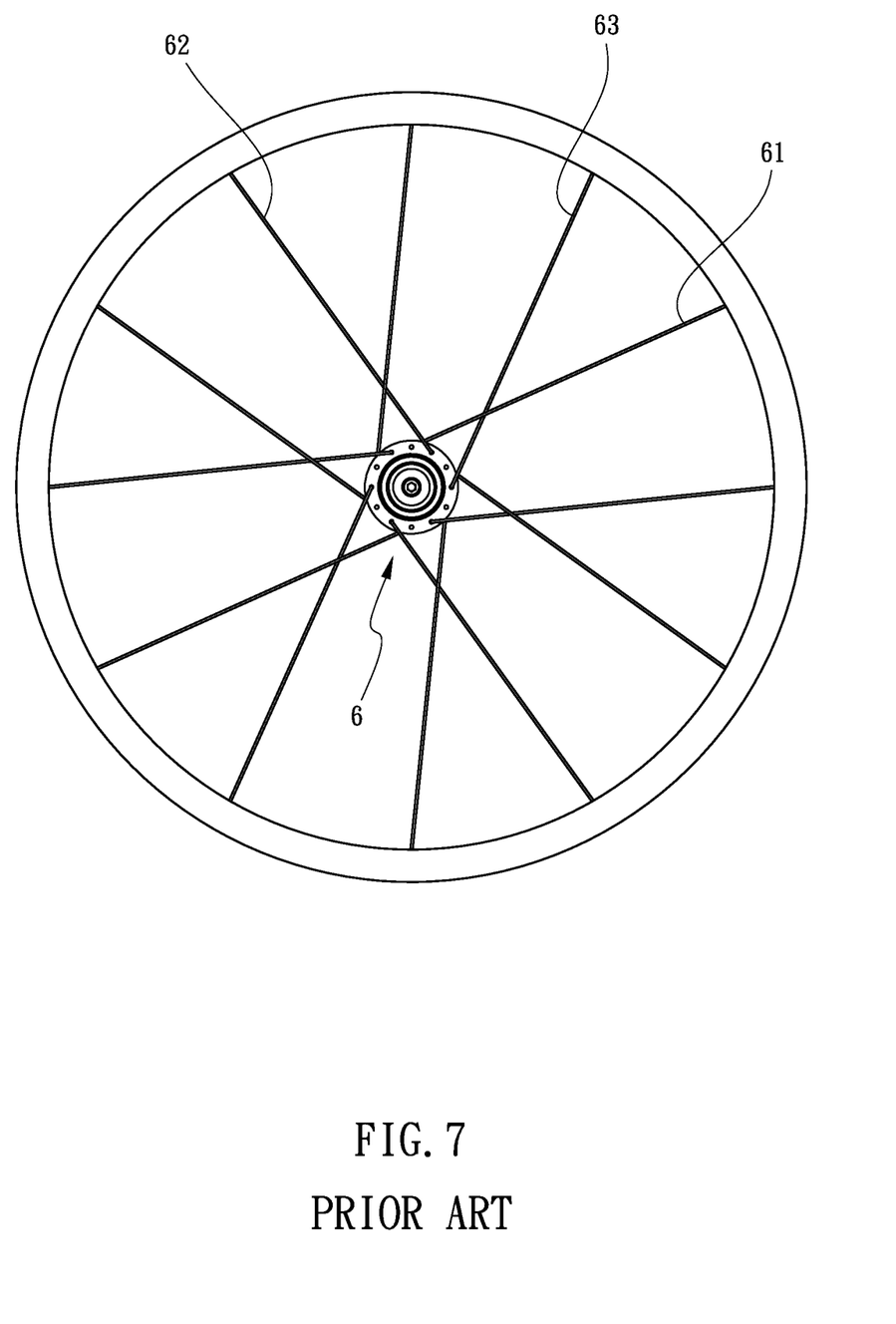
FIG. 7 is a side plane view of a rear hub assembly for bicycle in accordance with the prior art, wherein the rear hub assembly is assembled with a plurality of spokes and a wheel rim.

A conventional wheel set which has a hub assembly comprises a bicycle hub 6, a plurality of spokes and a wheel rim. The bicycle hub 6 has two hub plates mounted on two ends thereof, and each hub plate has a plurality of through holes defined therein adapted for receiving the spokes respectively. Two ends of each spoke respectively engage with a corresponding through hole and the wheel rim. The spokes, with their one ends engaging with the through holes, are arranged to engage with the through holes from an inner lateral surface of the hub plate and an outer lateral surface of the hub plate alternately such that every two adjacent spokes are located on opposite lateral surfaces (as shown in FIG. 7). The spokes are arranged in a crisscross pattern: the spoke 61 which is positioned on the inner lateral surface of the hub plate crosses under spoke 62 and crosses over spoke 63 which is positioned on the outer lateral surface of the hub plate. This patterning is known as semi-tangent spoking, where—each of the spokes is radially angled to cross at least one other spoke.

Figure 8:
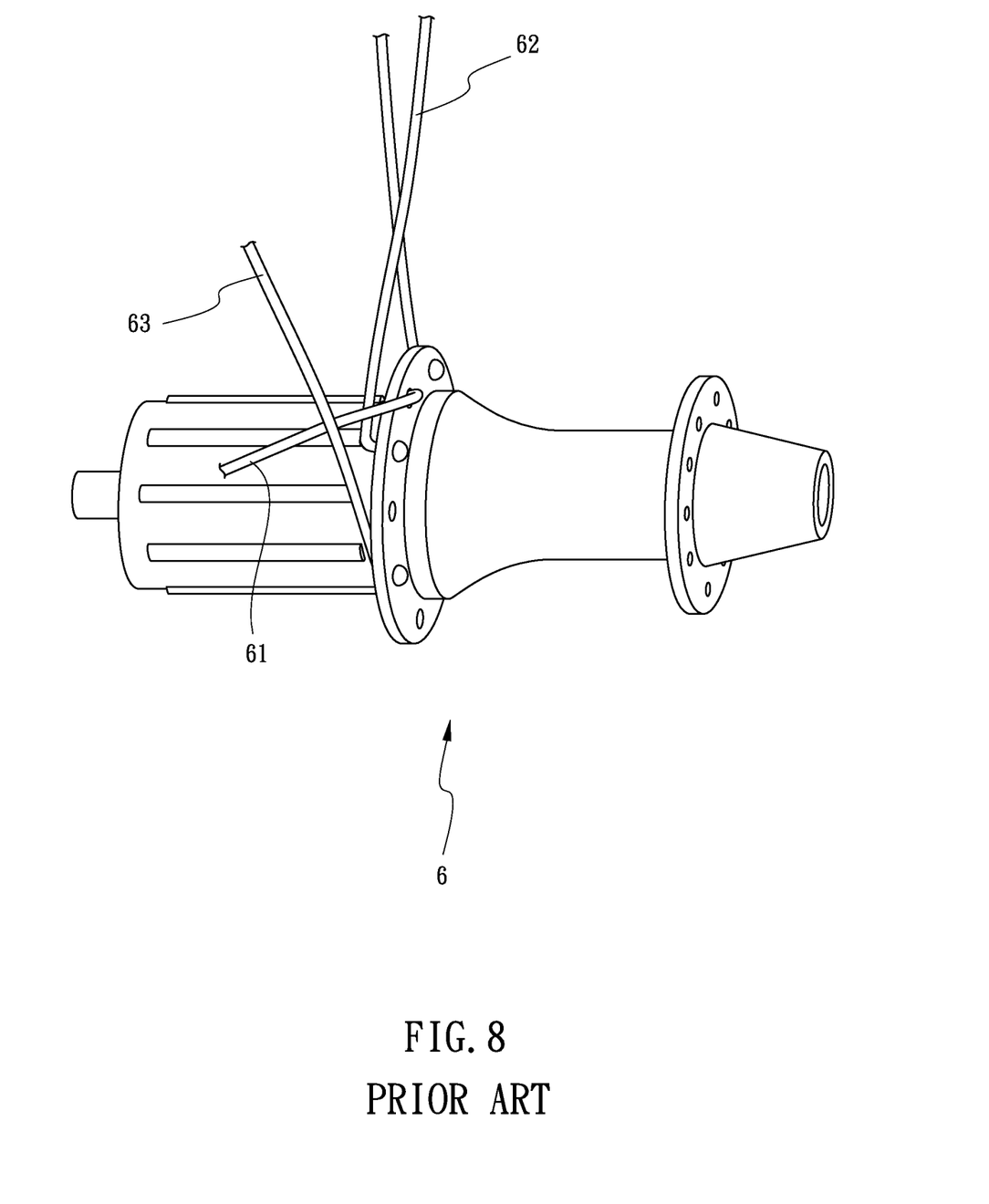
FIG. 8 is a partially enlarged perspective view of the rear hub assembly for bicycle in accordance with the prior art.

However, the conventional wheel set having a hub assembly has the following drawbacks: due to the spokes are arranged in the crisscross pattern, the spokes are intersected, such that the spokes are deformed due to thrusting with each other (as shown in FIG. 8). The overall strength of the wheel set is adversely affected due to deformation of the spokes. Moreover, the stability of the wheel set is also influenced, leading to potential risks during operation.

The present invention has arisen to obviate/mitigate the disadvantages of the conventional rear hub assembly for bicycle.

SUMMARY OF THE INVENTION

The main objective of the present invention is to provide an improved rear hub assembly for bicycle.

To achieve the objective, the rear hub assembly for bicycle in accordance with the present invention comprises a ratchet wheel. A hub body is assembled with the ratchet wheel. The hub body has a first hub plate and a second hub plate respectively disposed on two opposite ends thereof. The first hub plate and the second hub plate are integrally formed on the two opposite ends of the hub body respectively. The first hub plate is located adjacent to the ratchet wheel. The first hub plate has a plurality of protrusions annularly and equidistantly formed on an outer lateral surface thereof. Each protrusion is radially and gradually slanted toward the outer lateral surface of the first hub plate. A dodging portion is formed between every two adjacent protrusions. A plurality of recesses are annularly and equidistantly defined in an inner lateral surface of the first hub plate which is opposite to the outer lateral surface. The plurality of recesses correspond to the plurality of protrusions respectively. A plane portion is formed between every two adjacent recesses for corresponding to the dodging portion. The first hub plate has a plurality of bores laterally defined therein and extending from the outer lateral surface to the inner lateral surface thereof. The plurality of bores are respectively located on each protrusion and each dodging portion. A first stepped level difference is defined between every recess and the adjacent plane portion. A second stepped level difference is defined between every protrusion and the adjacent dodging portion. The first stepped level difference and the second stepped level difference are staggeredly and alternately arranged along a rotating axis of the hub body. The first stepped level difference has a predetermined value between 1.5 mm and 2.5 mm. A value of the second stepped level difference is equaled to that of the first stepped level difference.

A plurality of spokes are engaged with the bores respectively for adapting to connect the hub body with a wheel rim. Each spoke has a buckling end formed thereon. The buckling end passes through the corresponding bore for buckling the inner lateral surface of the first hub plate such that each spoke is securely buckled to the first hub plate and is positioned on the outer lateral surface of the hub first plate. Another end of each spoke extends radially outward from the outer lateral surface of the hub first plate for coupling with the wheel rim.

Each of the spokes located on the protrusions crosses over two adjacent spokes located on the dodging portions such that the spokes are arranged without thrustingly intersecting with each other.

In accordance with another aspect of the present invention, the hub body has an outer thread portion annularly formed on one end thereof. The first hub plate has an inner thread portion formed in an inner periphery thereof. The inner thread portion of the first hub plate corresponds to the outer thread portion of the hub body such that the first hub plate is threadedly secured to the hub body.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 4:
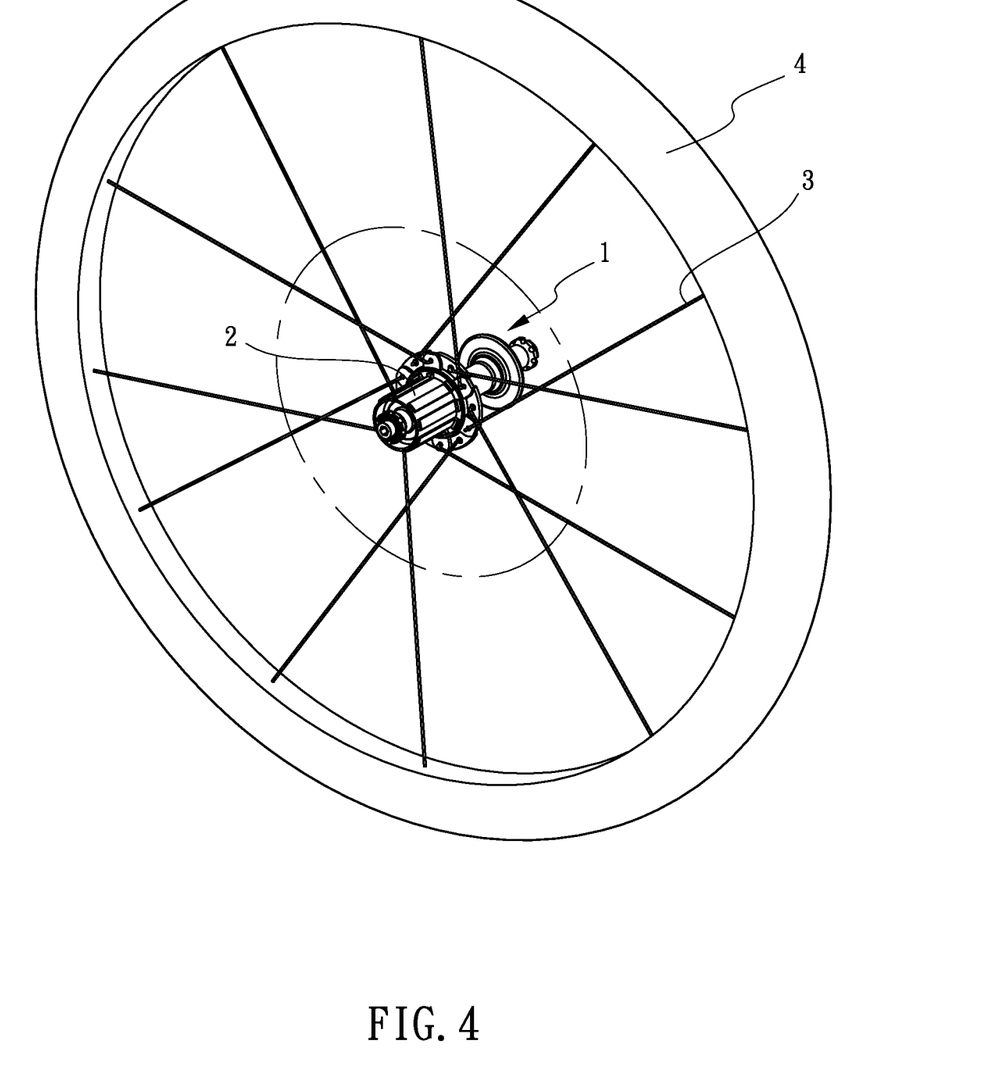
FIG. 4 is an assembled perspective view of the rear hub assembly for bicycle in accordance with the present invention viewing from another direction; wherein the present invention is assembled with the wheel rim via the plurality of spokes.
Figure 4A:
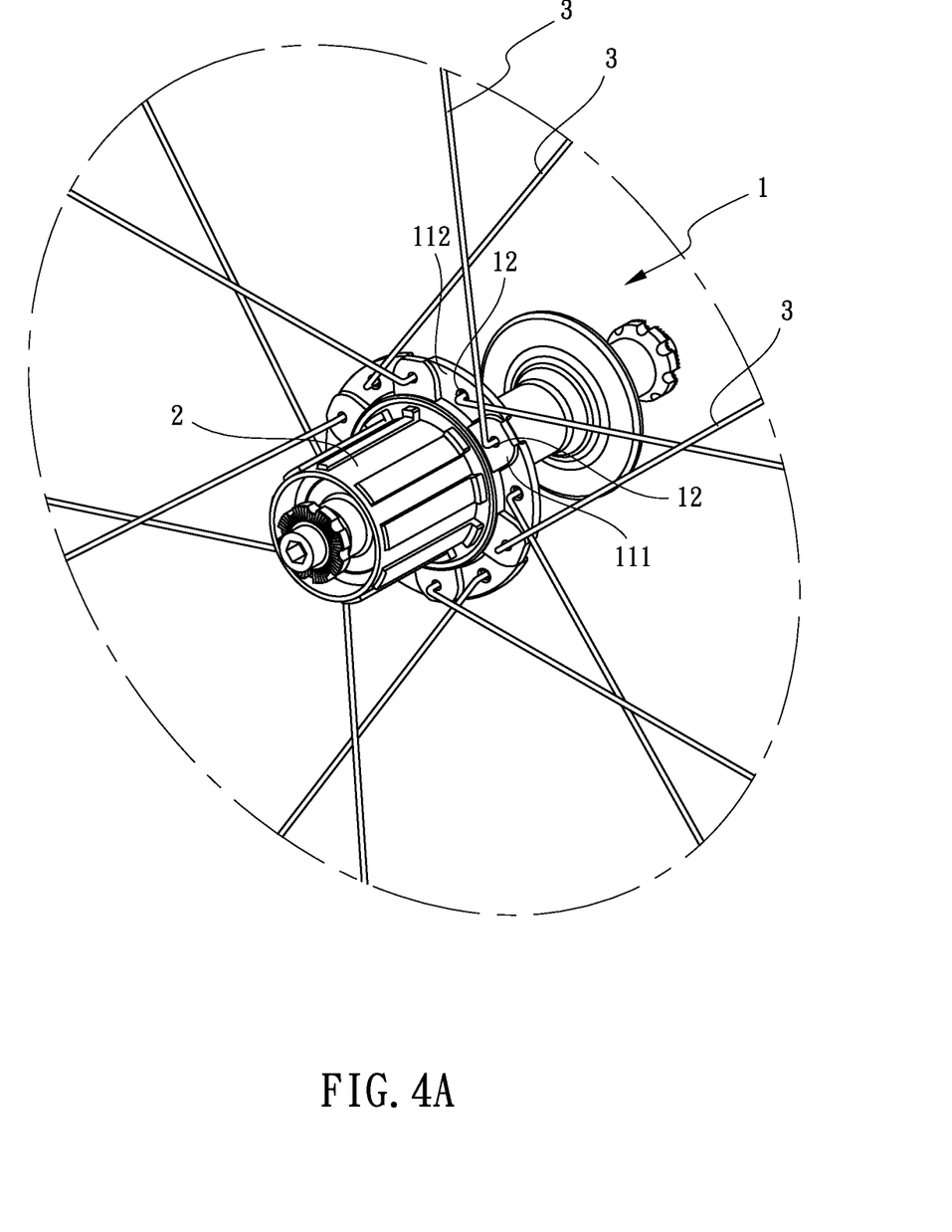
FIG. 4A is a partially enlarged perspective view of FIG. 4.
Figure 5:
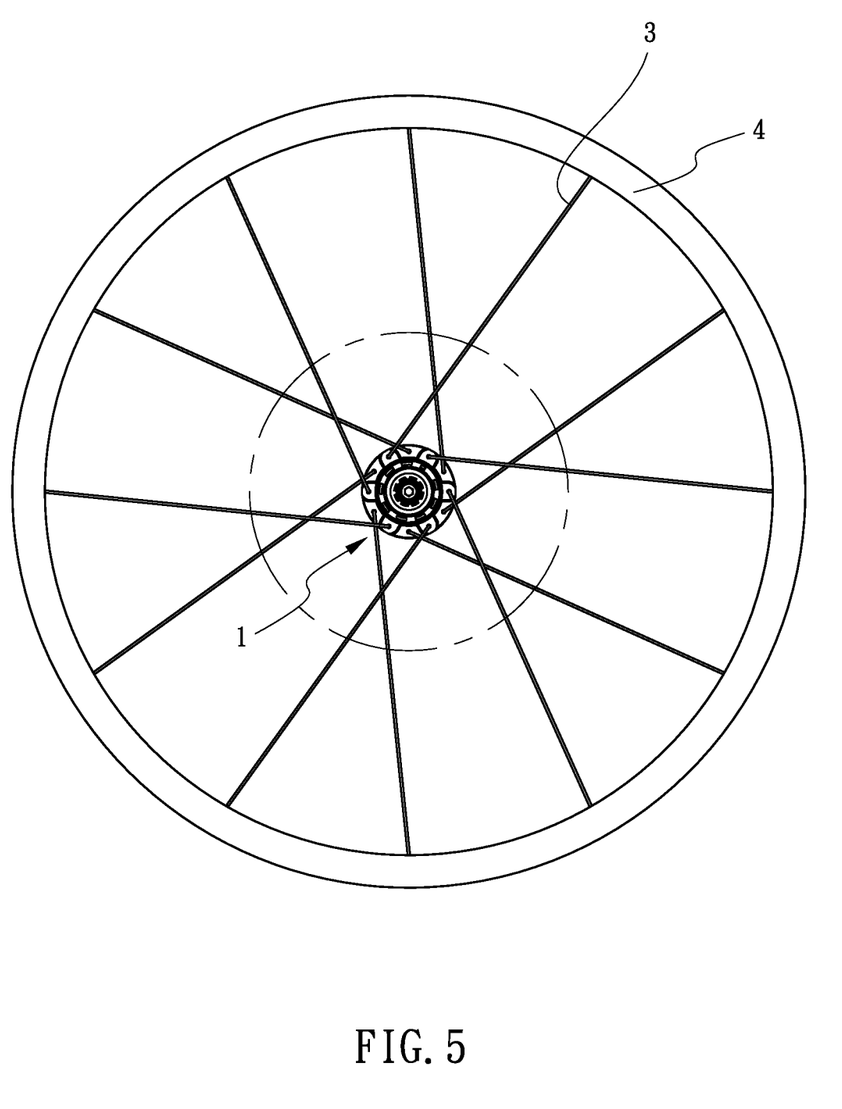
FIG. 5 is a plane view of the rear hub assembly in accordance with the present invention; wherein the present invention is assembled with the wheel rim via the plurality of spokes.
Figure 5A:
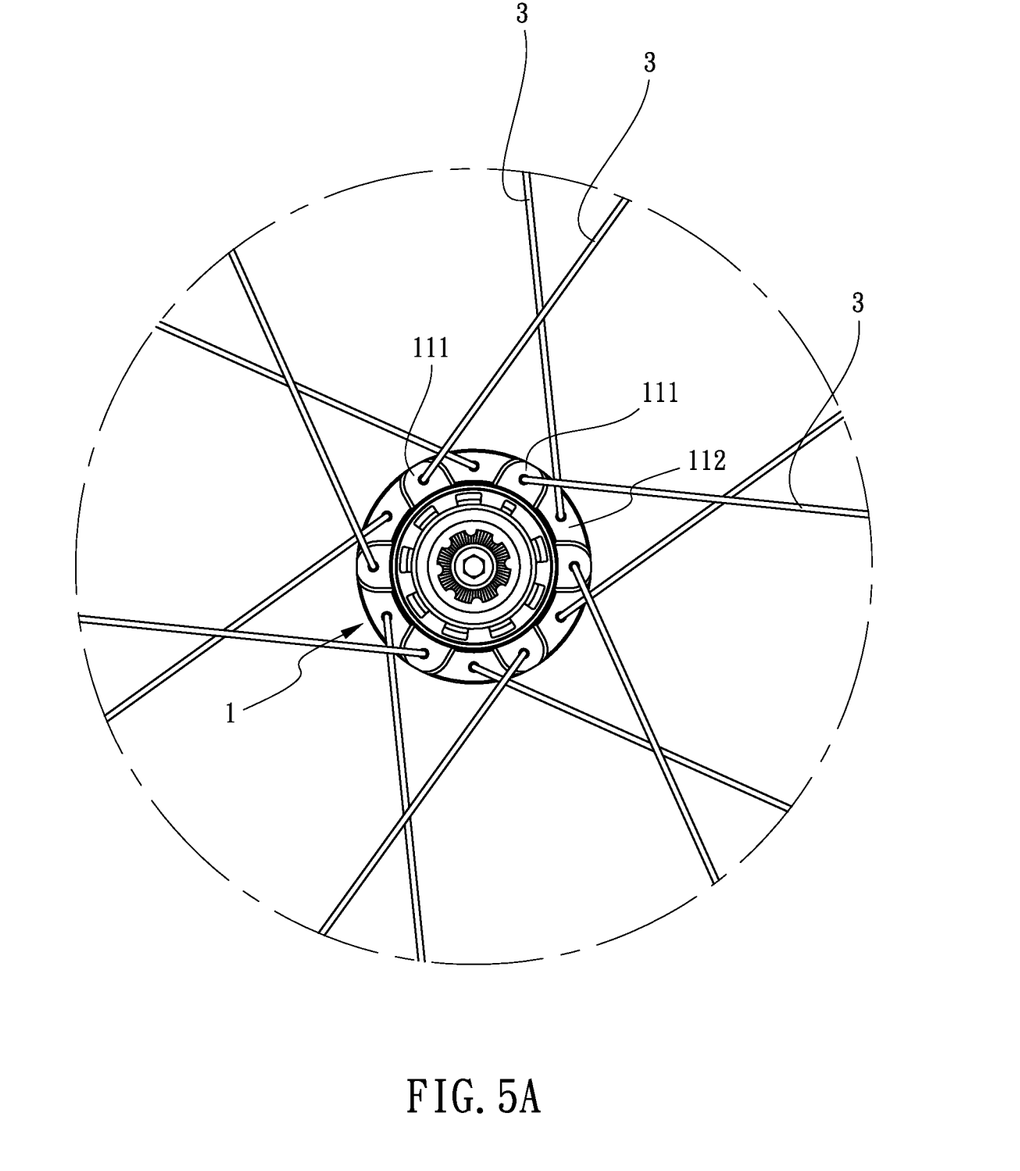
FIG. 5A is a partially enlarged view of FIG. 5.

Referring to the drawings and initially to FIGS. 1-5, a rear hub assembly for bicycle in accordance with the present invention comprises a ratchet wheel (2) and a hub body (1) which is assembled with the ratchet wheel (2). The hub body (1) has a first hub plate (11a) and a second hub plate (11b) respectively disposed on two opposite ends thereof. The first hub plate (11a) and the second hub plate (11b) are integrally formed on the two opposite ends the hub body (1) respectively. The first hub plate (11a) has six protrusions (111) annularly and equidistantly formed on an outer lateral surface thereof (as shown in FIGS. 5-5A). Each protrusion (111) is radially and gradually slanted toward the outer lateral surface of the first hub plate (11a). A dodging portion (112) is formed between every two adjacent protrusions (111). Six recesses (113) are annularly and equidistantly defined in an inner lateral surface of the first hub plate (11a) opposite to the outer lateral surface. The six recesses (113) correspond to the six protrusions (111) respectively. A plane portion (114) is formed between every two adjacent recesses (113) for corresponding to the dodging portion (112). Each plane portion (114) is located adjoining to the corresponding dodging portion (112). The first hub plate (11a) has a plurality of bores (12) laterally defined therein and extending from the outer lateral surface to the inner lateral surface thereof. The plurality of bores (12) are respectively located on each protrusion (111) and each dodging portion (112).

Figure 1:
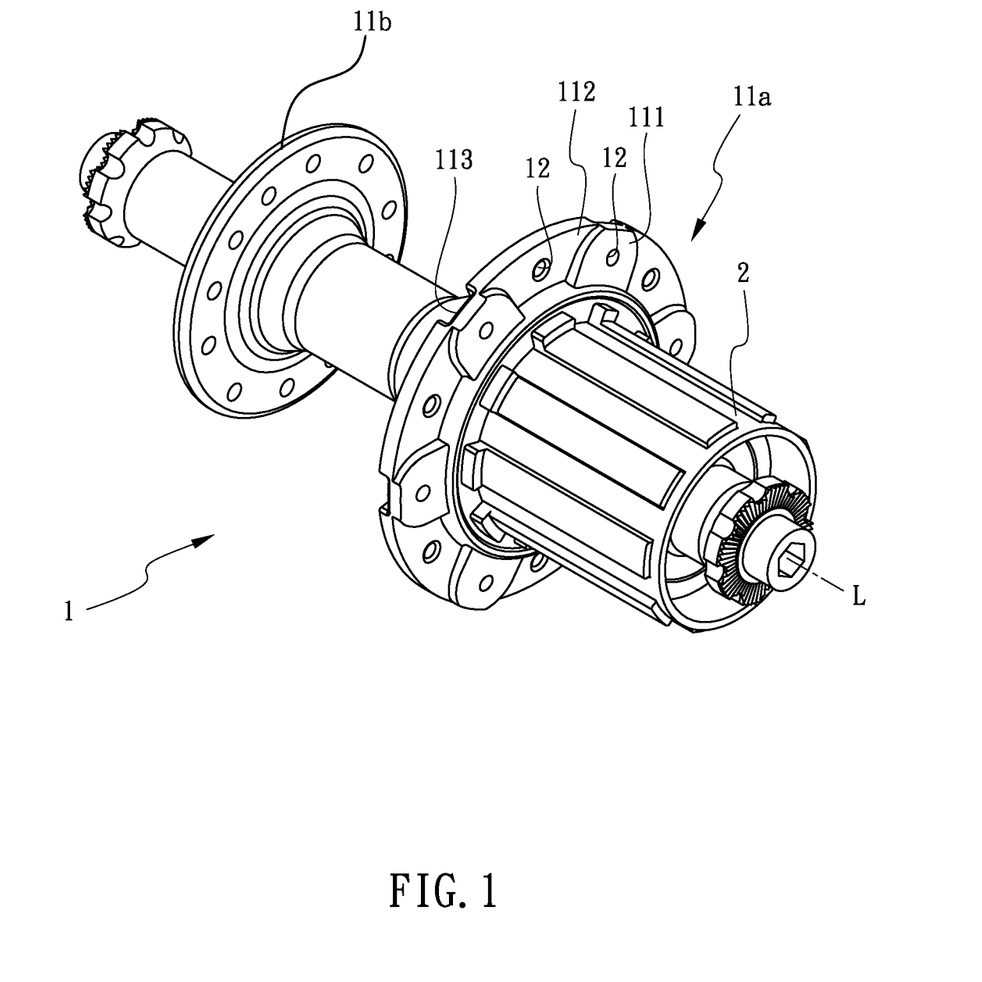
FIG. 1 is an assembled perspective view of the rear hub assembly for bicycle in accordance with the present invention.
Figure 2:
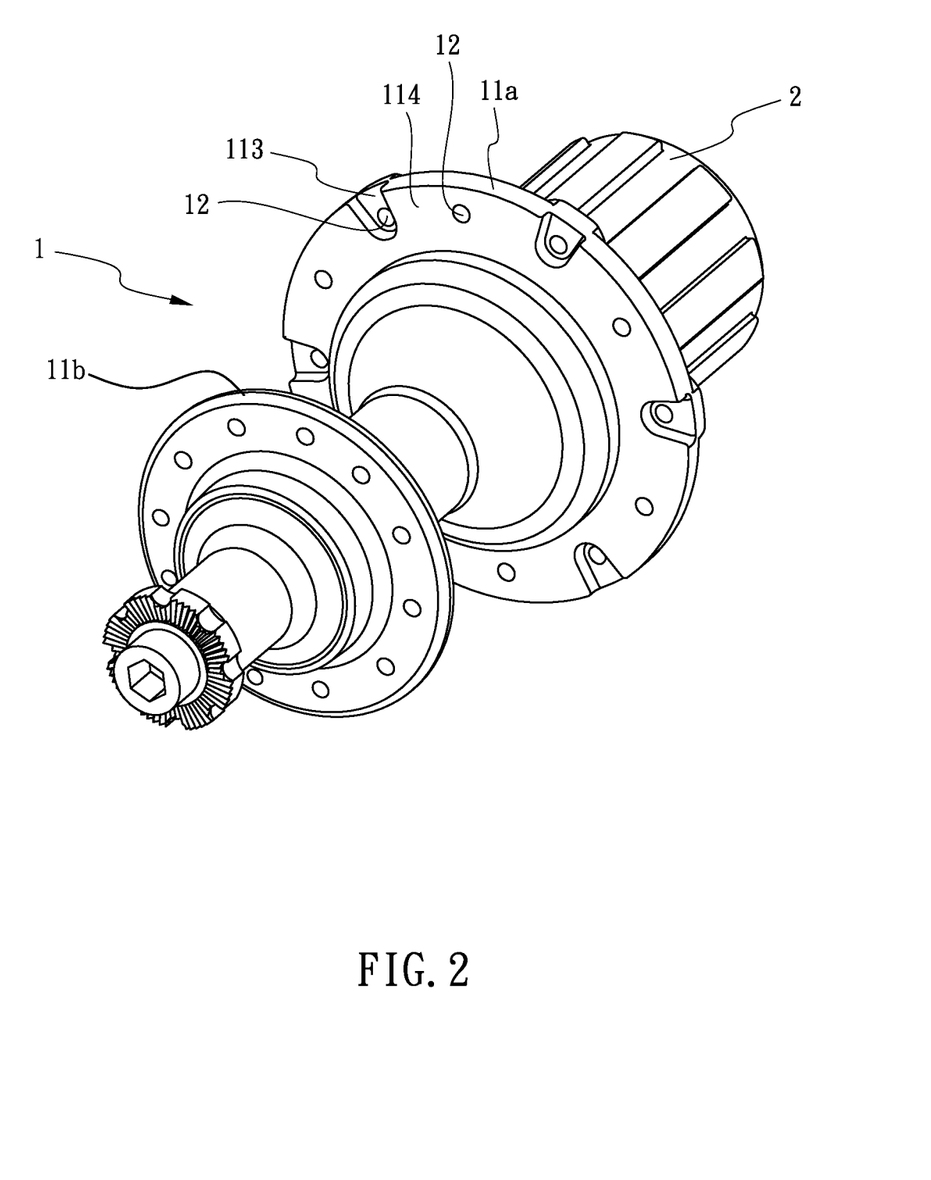
FIG. 2 is another assembled perspective view of the rear hub assembly for bicycle in accordance with the present invention viewed from another direction.
Figure 2A:
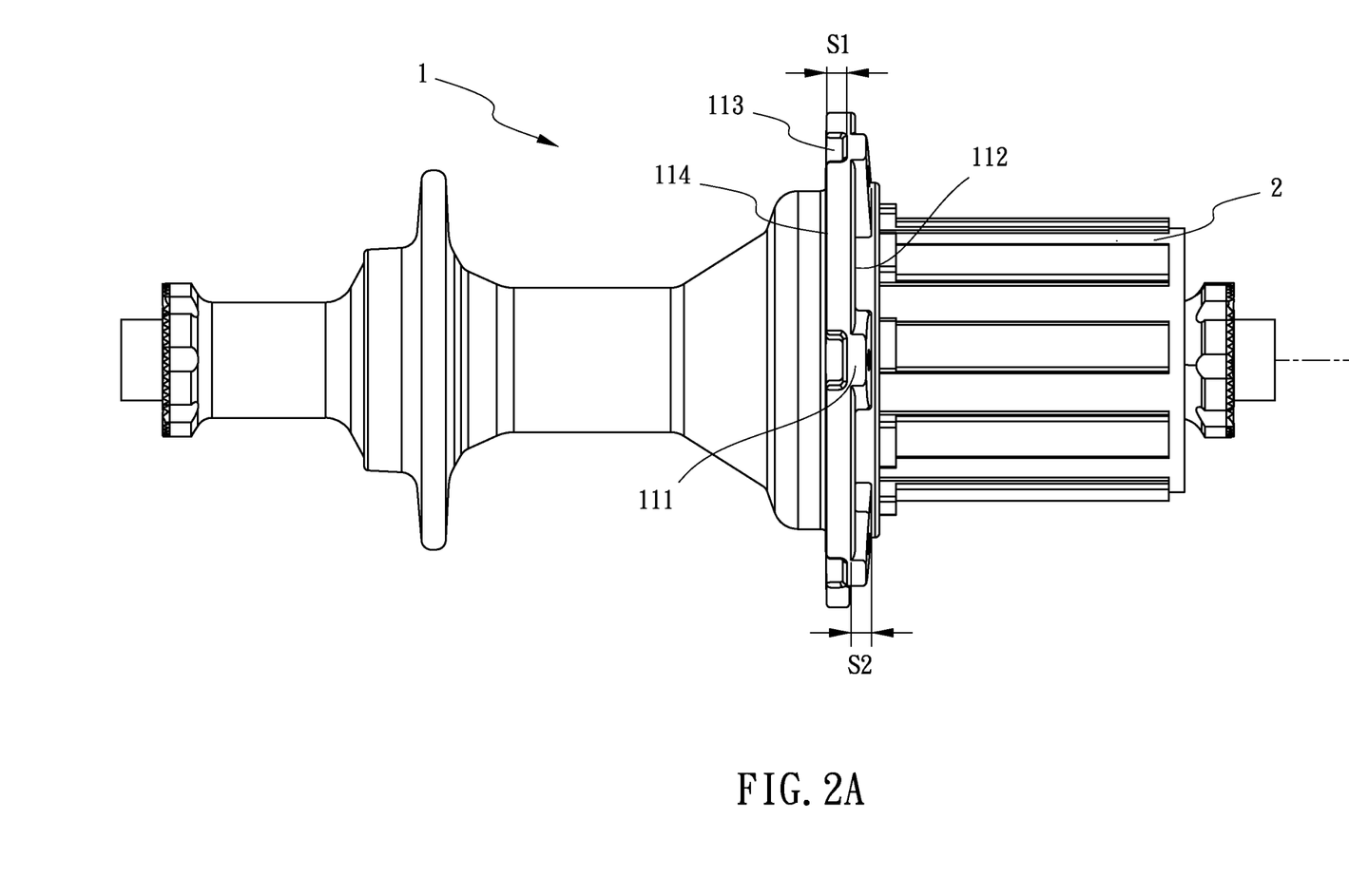
FIG. 2A is a side plane view of the rear hub assembly for bicycle in accordance with the present invention.
Figure 3:
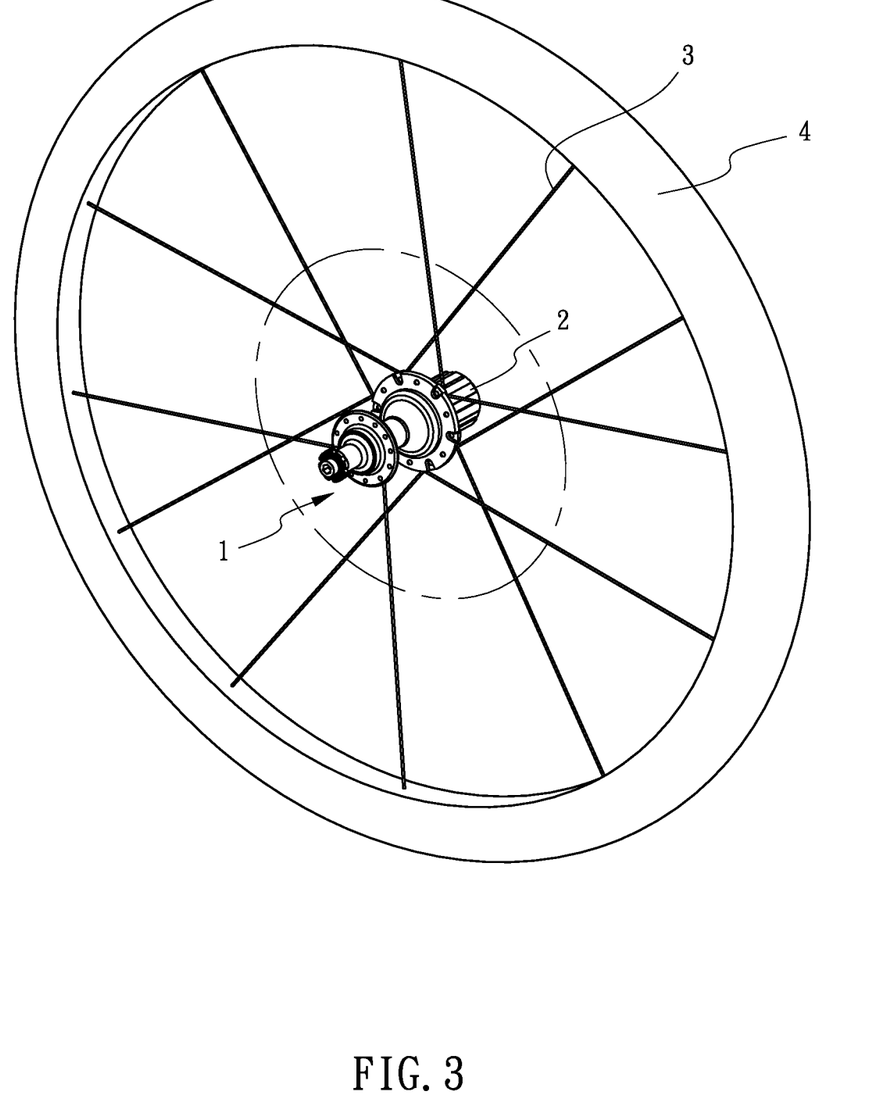
FIG. 3 is an assembled perspective view of the rear hub assembly for bicycle in accordance with the present invention, wherein the present invention is assembled with a wheel rim via a plurality of spokes.
Figure 3A:
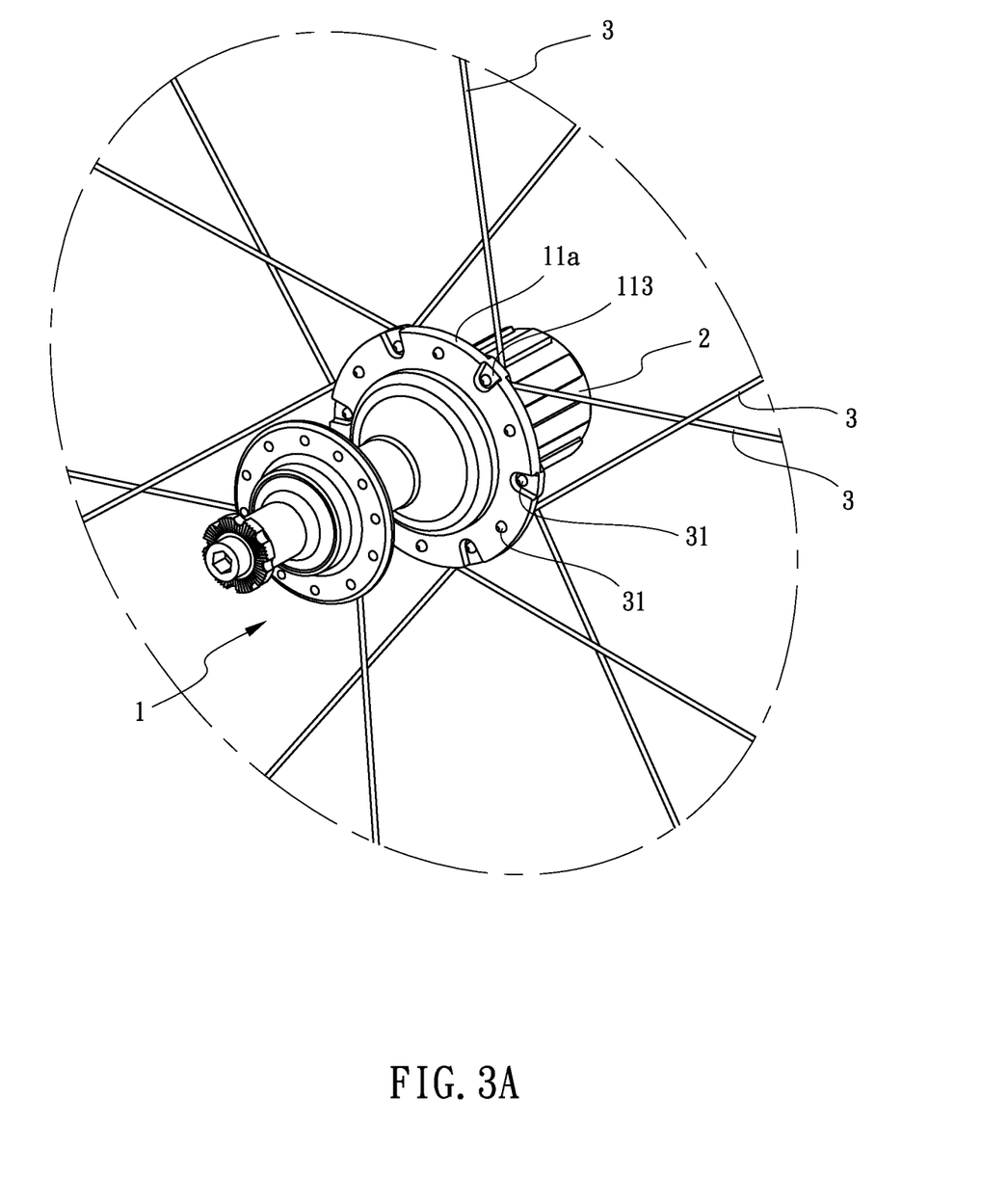
FIG. 3A is a partially enlarged perspective view of FIG. 3.

As shown in FIG. 2A, a first stepped level difference (S1) is defined between every recess and the adjacent plane portion (114). A second stepped level difference (S2) is defined between every protrusion (111) and the adjacent dodging portion (112). The first stepped level difference (S1) and the second stepped level difference (S2) are staggeredly and alternately arranged along a rotating axis (L) of the hub body (1). The first stepped level difference (S1) has a predetermined value between 1.5 mm and 2.5 mm. A value of the second stepped level difference (S2) is equaled to that of the first stepped level difference (S1). 2 mm is determined as being the optimum value of the first stepped level difference (S1) and the second stepped level difference (S2).

A plurality of spokes (3) are engaged with the bores (12) respectively for adapting to connect the hub body (1) with a wheel rim (4). Each spoke (3) has a buckling end (31) formed thereon. The buckling end (31) passes through the corresponding bore (12) defined in the first hub plate (11a). The buckling end (31) is buckled with the inner lateral surface of the first hub plate (11a) such that each spoke (3) is securely buckled to the first hub plate (11a) and is positioned at the outer lateral surface of the first hub plate (11a). Another end of the spoke (3) extends radially outward from the outer lateral surface of the first hub plate (11a) for coupling with the wheel rim (4).

Referring to FIGS. 3-5A, during installation, to start with, the buckling ends (31) of a first set of spokes (3) respectively pass through the bores located on the dodging portions (112) of the first hub plate (11a) and buckled with the inner lateral surface of the first hub plate (11a) Another end of each of the first set of spokes (3) extends radially outward from the outer lateral surface of the first hub plate (11a) and is coupled with the wheel rim (4). Next, the buckling ends (31) of a second set of spokes (3) respectively engages with the bores (12) located on the protrusions (111). Another end of each of the second set of spokes (3) extends radially outward from the outer lateral surface of the first hub plate (11a) in a predetermined angle and is coupled with the wheel rim (4). The first set of spokes (3) and the second set of spokes (3) are arrayed in opposite directions. Each of the first set of spokes (3), which is located on the protrusion, crosses over two of the second set of spokes (3) which are located on two adjacent dodging portions (112) (as shown in FIGS. 4-5).

Due to a clearance provided by each first stepped level difference (S1) and each second stepped level difference (S2) (as shown in FIG. 2A), the spokes (3) are arranged in a crisscross pattern without thrustingly intersecting with each other. Each of the first set of spokes (3) which is respectively located on the corresponding dodging portion (112) of the first hub plate (11a) literally dodges (or merely slightly contacts with) the second set of spokes (3) which are located on the protrusions (111) of the first hub plate (11a). Further, the spokes (3) are all positioned on the outer lateral surface of the first hub plate (11a). Therefore, in the present invention, the spokes (3) are prevented from deformation due to crossing/intersecting with each other from opposite lateral surfaces of the hub plate as those disclosed in the prior art. In addition, a torque transmitted from each spoke (3) to the wheel rim (4) is not interrupted, such that the present invention provides remarkable stability. Moreover, an overall strength of the rear hub assembly for bicycle in accordance with the present invention is also enhanced.

In the preferred embodiment, the plurality of spokes (3) may be single-butted spokes (3), double-butted spokes (3), or triple-butted spokes (3).

Figure 6:
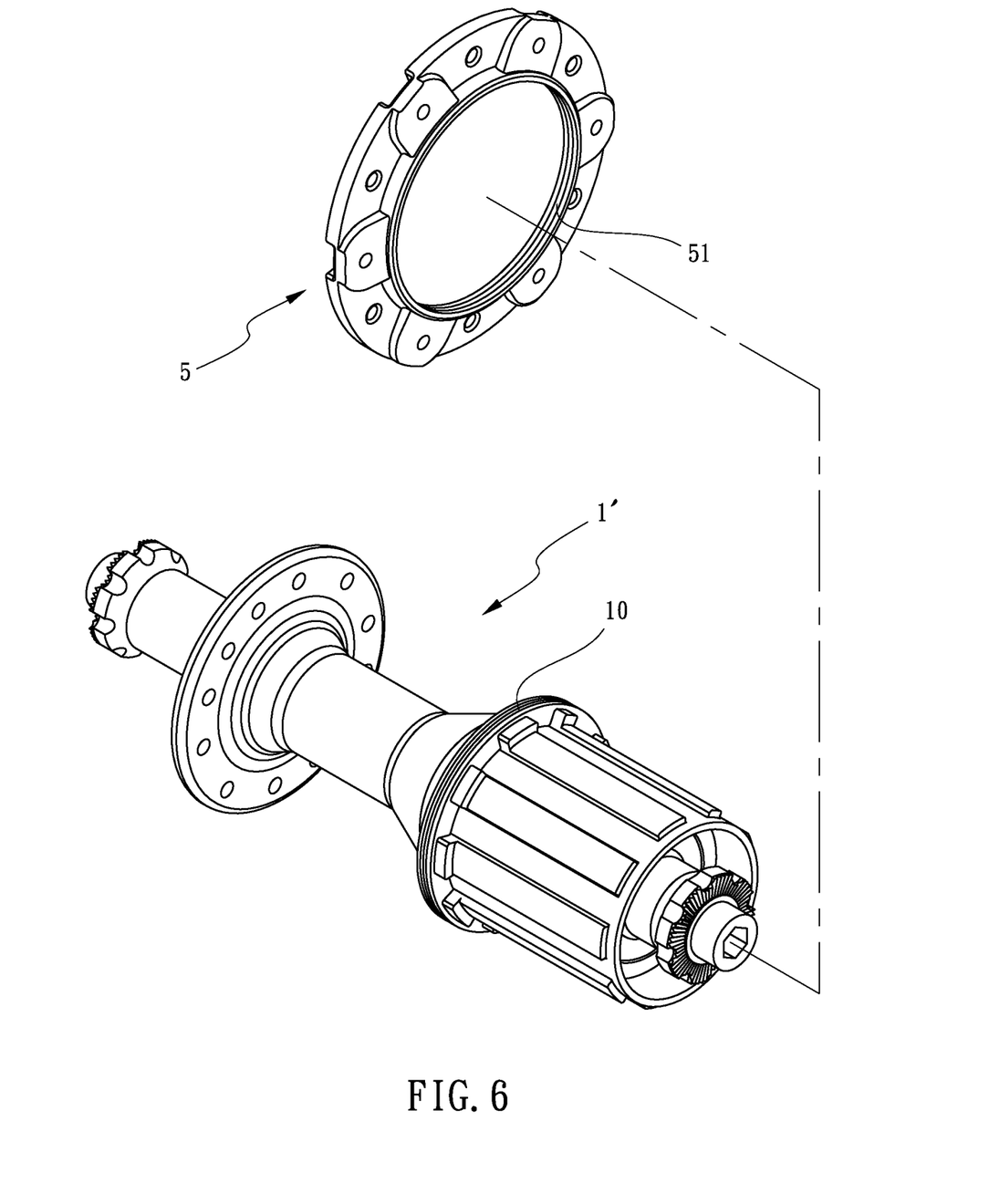
FIG. 6 is an exploded perspective view of a second embodiment of the rear hub assembly for bicycle in accordance with the present invention.

With reference to FIG. 6, that shows a second embodiment of the present invention. The elements and effects of the second embodiment which are the same with the preferred embodiment are not described, only the differences are described. In this embodiment, the hub body (1') has an outer thread portion (10) annularly formed on one end thereof. The first hub plate (5) has an inner thread portion (51) annularly formed in an inner periphery thereof and corresponding to the outer thread portion (10) of the hub body (1') such that the first hub plate (5) is threadedly and detachably secured to the hub body (1') for allowing a user to assemble or disassemble easily.

Although the invention has been explained in relations to its preferred embodiment, it is to be understood that many other possible modifications and variations can be made without departing from the spirit and scope of the invention as hereinafter claimed.

What is claimed is:

1. A rear hub assembly for bicycle comprising:
a ratchet wheel;
a hub body assembled with the ratchet wheel, the hub body having a first hub plate and a second hub plate respectively disposed on two opposite ends thereof, the first hub plate located adjacent to the ratchet wheel, the first hub plate having a plurality of protrusions annularly and equidistantly formed on an outer lateral surface thereof, a dodging portion formed between every two adjacent protrusions; a plurality of recesses annularly and equidistantly defined in an inner lateral surface of the first hub plate, the plurality of recesses corresponded to the plurality of protrusions respectively, a plane portion is formed between every two adjacent recesses for corresponding to the dodging portion; the first hub plate having a plurality of bores laterally defined therein and extending from the outer lateral surface to the inner lateral surface thereof, the plurality of bores respectively located on each protrusion and each dodging portion; a first stepped level difference defined between every recess and the adjacent plane portion, a second stepped level difference defined between every protrusion and the adjacent dodging portion; the first stepped level difference and the second stepped level difference staggeredly and alternately arranged along a rotating axis of the hub body; and a plurality of spokes engaged with the bores respectively for adapting to connect the hub body with a wheel rim, each spoke having a buckling end formed thereon, the buckling end passing through the corresponding bore for buckling the inner lateral surface of the first hub plate such that each spoke is securely buckled to first the hub plate and is positioned on the outer lateral surface of the first hub plate, another end of each spoke extending radially outward from the outer lateral surface of the first hub plate for coupling with the wheel rim;

wherein each of the spokes located on the protrusions crosses over two adjacent spokes located on the dodging portions such that the spokes are arranged without thrustingly intersecting with each other.

2. The rear hub assembly for bicycle as claimed in claim 1, wherein the first hub plate and the second hub plate are integrally formed on the two ends of the hub body respectively.

3. The rear hub assembly for bicycle as claimed in claim 1, wherein the hub body has an outer thread portion annularly formed on one end thereof; the first hub plate having an inner thread portion formed in an inner periphery thereof and corresponding to the outer thread portion of the hub body such that the first hub plate is threadedly secured to the hub body.

4. The rear hub assembly for bicycle as claimed in claim 1, wherein the first stepped level difference has a predetermined value between 1.5 mm and 2.5 mm; a value of the second stepped level difference equaled to that of the first stepped level difference.

5. The rear hub assembly for bicycle as claimed in claim 1, wherein each protrusion is radially and gradually slanted toward the outer lateral surface of the first hub plate.

* * * * *